June 6, 1939.　　　S. SCHNELL　　　2,161,640

BRAKING MECHANISM

Filed March 11, 1937　　　3 Sheets-Sheet 1

INVENTOR
STEVE SCHNELL
BY
*ATTORNEY*

June 6, 1939.  S. SCHNELL  2,161,640
BRAKING MECHANISM
Filed March 11, 1937  3 Sheets-Sheet 2
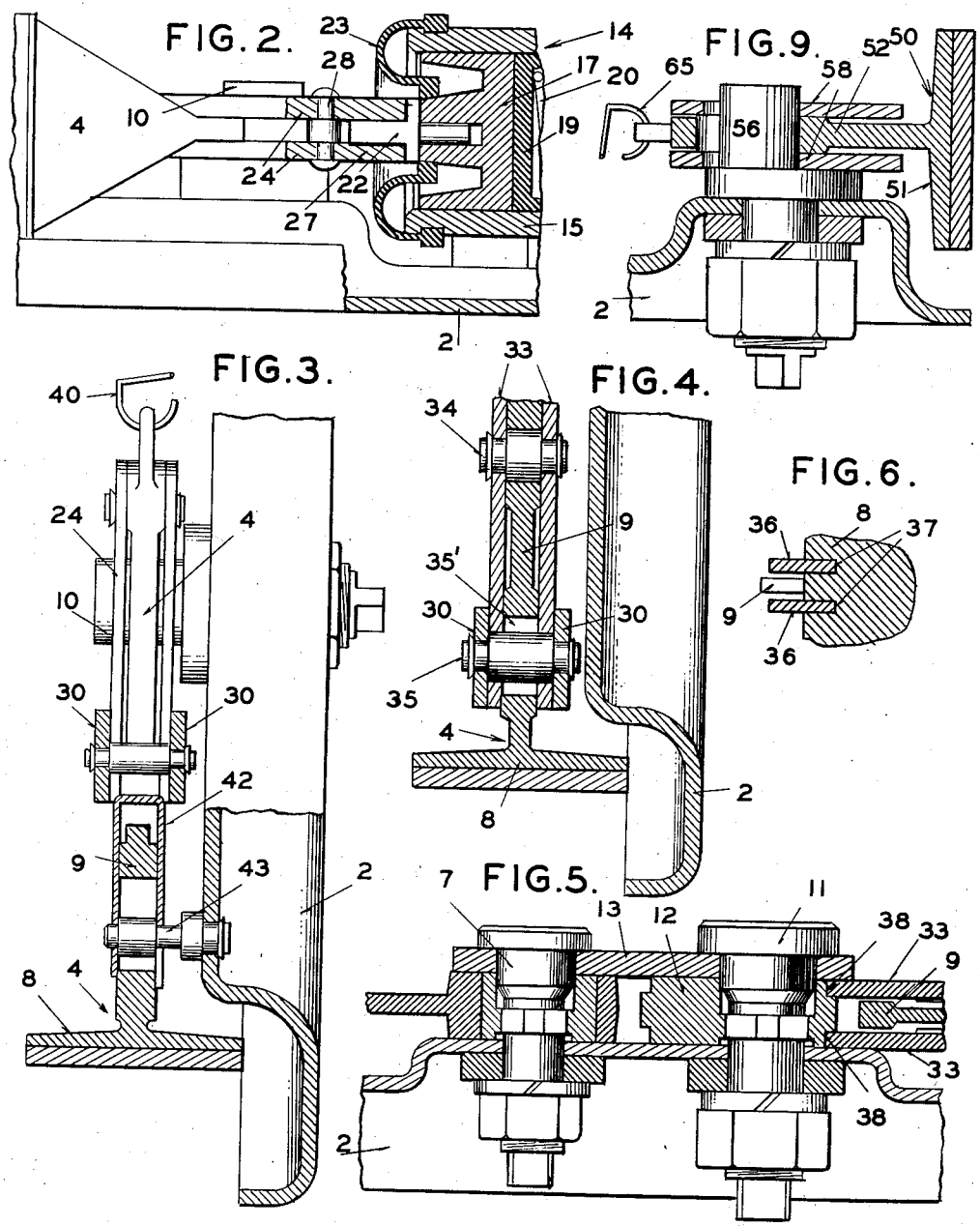
INVENTOR
STEVE SCHNELL
BY
*E. T. Huffman*
ATTORNEY June 6, 1939. S. SCHNELL 2,161,640
BRAKING MECHANISM
Filed March 11, 1937 3 Sheets-Sheet 3

INVENTOR
STEVE SCHNELL
BY
ATTORNEY

Patented June 6, 1939

2,161,640

UNITED STATES PATENT OFFICE 2,161,640

BRAKING MECHANISM

Steve Schnell, St. Louis, Mo., assignor to Wagner Electric Corporation, St. Louis, Mo., a corporation of Delaware Application March 11, 1937, Serial No. 130,267

17 Claims. (Cl. 188—152)

My invention relates to braking mechanism and more particularly to an improved actuating mechanism for the brake shoes thereof.

One of the objects of my invention is to construct an improved mechanism embodying a single actuator for applying pressure to the unanchored ends of a plurality of shoes in a brake in which the shoes are so anchored that they will act as "forward" shoes in one direction of rotation of the drum.

Still another object of my invention is to provide for a brake shoe which is capable of anchoring at either of its ends, depending upon the direction of rotation of the drum, an actuating mechanism which will apply pressure to one end of the shoe when the brake drum is rotating in one direction and to the other end of the shoe when the brake drum is rotating in the opposite direction.

Figure 1:
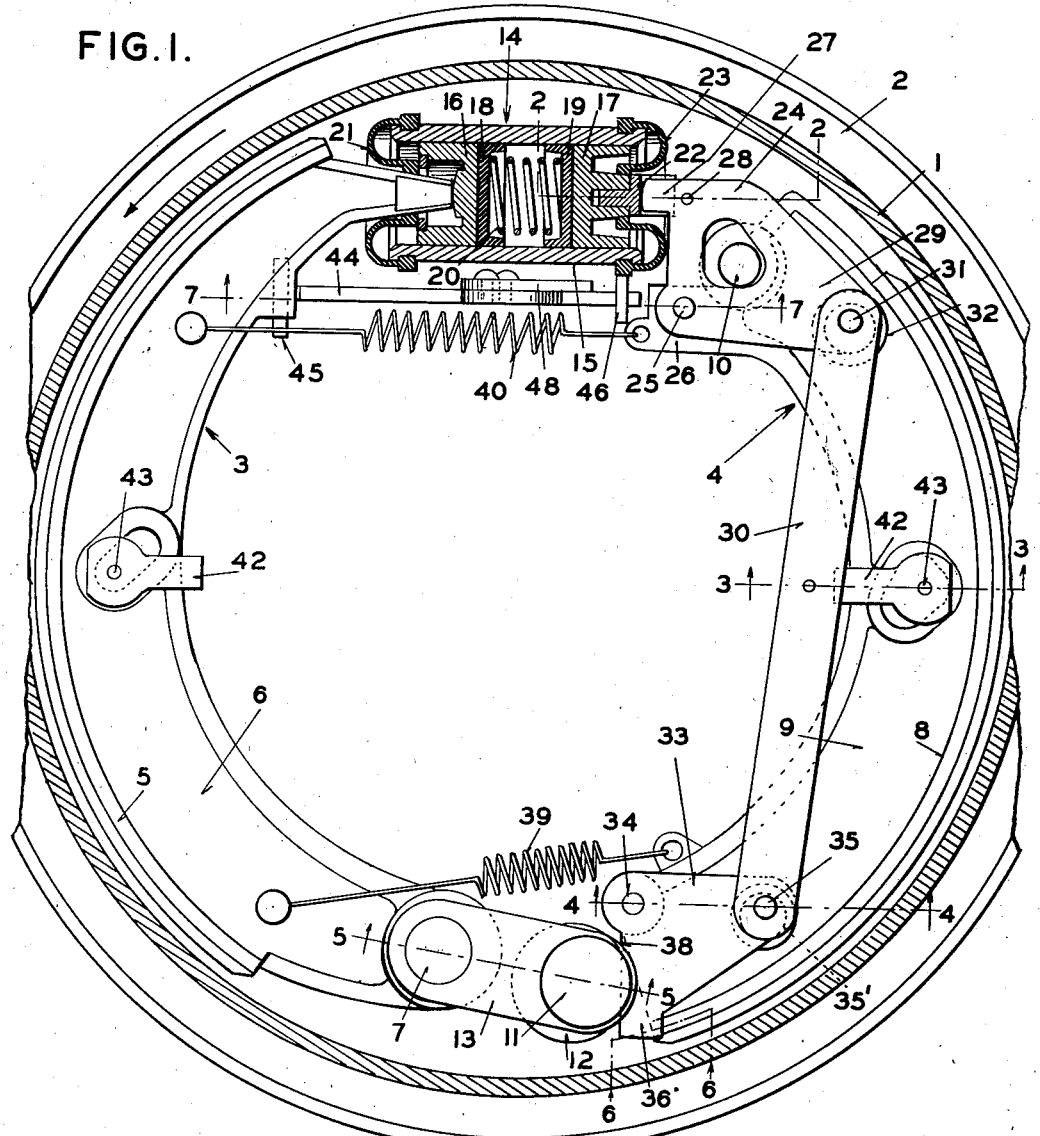
Figure 10:
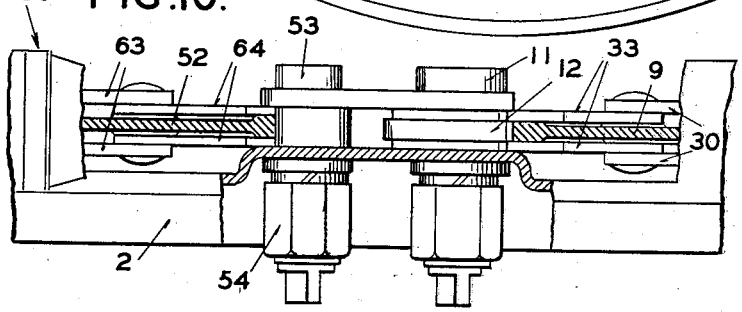

Other objects will become apparent from the following description taken in connection with the accompanying drawings in which Figure 1 is a side view of a brake assembly showing my invention embodied therein; Figures 2, 3, 4, 5, 6, and 7 are cross-sectional views of different parts of the brake assembly of Figure 1, said views being taken on the lines 2—2, 3—3, 4—4, 5—5, 6—6, and 7—7, respectively, of Figure 1; Figure 8 is a view of a brake assembly showing the brake actuating mechanism associated with both shoes; Figure 9 is a cross-sectional view taken on the line 9—9 of Figure 8; and Figure 10 is a bottom view of Figure 8, parts being in cross section.

Referring to Figures 1 to 7, inclusive, the reference character 1 indicates the brake drum which is secured to the wheel of the vehicle and enclosed by a backing plate 2 fastened to some fixed part of the vehicle, as for example, the axle or the axle housing. Within the brake drum, for cooperation therewith, is a pair of brake shoes 3 and 4 positioned in end-to-end relation. The brake shoe 3, which is of well-known construction, comprises a lining carrying flange 5 and a web 6 and the lower end thereof is anchored to the backing plate by means of an eccentric anchor pin 7 which is adjustable from the exterior of the backing plate in a conventional manner.

The brake shoe 4 also comprises a lining carrying flange 8 and a web 9 and is free to shift slightly circumferential with the drum in order to anchor on either of its ends depending upon the direction of rotation of the drum. The anchoring means for the upper end of the shoe consists of an anchor pin 10 eccentrically mounted in the backing plate in a manner similar to pin 7 in order that the pin may be properly adjusted. The anchor pin 11 (Figure 5) for the lower end of the shoe is positioned adjacent anchor pin 7 and is also adjustably mounted in the backing plate and provided with an eccentric collar 12. The two anchor pins 7 and 11 are tied together at their inner ends by a plate 13 in order that one may brace the other.

The mechanism which I have illustrated for actuating the brake shoes 3 and 4 is a fluid motor 14 of well-known construction but it is to be understood that other means may be employed if it is desired to actuate the brake shoes by means other than fluid under pressure. The fluid motor shown comprises a cylinder 15 secured to backing plate 2, and within this cylinder is a pair of opposed pistons 16 and 17. The piston 16 is provided with a packing cup 18, and piston 17 is provided with a packing cup 19 to prevent leakage of fluid past the pistons. These packing cups are maintained in engagement with their respective pistons by a light spring 20 which also holds the pistons in spaced relation. The piston 16 is adapted to directly engage the upper end of brake shoe 3 in order to actuate it into engagement with the drum. A suitable dust excluding boot 21 is provided to close the end of the cylinder around the portion of the shoe which projects into the cylinder and engages piston 16. The piston 17 is of slightly different construction than piston 16, the central portion thereof being provided with a plug 22 for engaging my novel actuating means mounted upon shoe 4. The open end of the cylinder adjacent piston 17 is also provided with a dust excluding boot 23.

The upper end of shoe 4 adjacent fluid motor 14 has pivotally mounted on opposite sides of its web portion two triangular-shaped levers 24, the pivoting means comprising a pin 25 carried on an extended portion 26 of the end portion of the web. The central portions of the levers are cut away, as shown, in order that they may have free movement without being interfered with by anchor pin 10. The ends 27 of the levers are positioned to engage plug 22 of piston 17 and these levers are connected together adjacent this point by means of pin 28. The other ends 29 of levers 24 are positioned adjacent the web portion of shoe 4 and pivotally connected to links 30, the connection comprising a pin 31 extending through an enlarged opening 32 in the web of the shoe.

The lower ends of links 30 are pivotally connected to a pair of triangular-shaped levers 33 positioned on opposite sides of web 9 and pivotally connected by means of a pin 34 to the end of the web. The pivotal connection between links 30 and levers 33 comprises a pin 35 extending through an enlarged opening 35' in the web. The lower portions of levers 33 are provided with projections 36 which extend into slots 37 in the extreme end of the lining carrying portion 8 of the brake shoe (Figure 6). The outer edges 38 of levers 33 are adapted to lie adjacent and in engagement with the eccentric collar 12 carried by anchor pin 11 previously referred to. It is thus seen from this construction that shoe 4 is capable of anchoring upon anchor pin 11 through the medium of levers 33 when the drum is rotating in the direction opposite that indicated by the arrow since the levers act as rigid pieces between the shoe and the anchor pin under these conditions.

The edges 38 of the levers and the projections 36 are normally maintained in contact with the eccentric collar 12 and the end of the lining carrying portion 8, respectively, by means of a spring 39 connected to the webs of shoes 3 and 4. A retractile spring 40 is also employed at the upper ends of the two shoes for normally holding these shoes retracted from the drum, this spring being connected at one end to the web of shoe 3 and at the other end to the projecting portion 26 on shoe 4. The retracted position of shoe 3 is determined by the eccentric cam 41 carried by the backing plate, and the retracted position of the upper end of shoe 4 is determined by the adjustable anchor pin 10 with which the notched end of the shoe is adapted to engage. The shoes 3 and 4 are yieldably positioned with respect to the backing plate by U-shaped spring clips 42 carried on pins 43 extending from the backing plate.

In connection with the hydraulic motor for expanding the two shoes, I have also disclosed an auxiliary actuating means in order that the shoes may be mechanically-actuated for parking purposes or in the event of failure of the fluid motor as an emergency actuating means. The mechanical means disclosed is of well-known construction, being shown in substantially the same form in my Patent, No. 1,940,022, issued December 19, 1933. Briefly described, the mechanism comprises a slidable member 44 mounted in guides 45 and 46 carried by the backing plate in such a manner that one end of the member is in position to engage shoe 3. Another short slidable member 47 is also mounted in guide 46 and the outer end thereof is adapted to engage the extended portion 26 of shoe 4. An actuating lever 48 is pivoted at its central portion to the slidable member 44 and at its inner end to the slidable member 47. The other end of the lever extends through an opening in the backing plate and is connected to a suitable pull rod 49 leading to the manually operable lever (not shown). A spring biased plate 48' is carried by lever 48 and closes the enlarged opening of the backing plate.

Referring to the operation of the above described brake and first assuming that the drum is rotating in the direction corresponding to the forward movement of the vehicle, as indicated by the arrow, when fluid under pressure is forced into fluid motor 14 to move the pistons outwardly in opposite directions, the movement of piston 16 will cause brake shoe 3 to be rotated about its anchor pin 7 and forced into engagement with the drum. Under these conditions this shoe will act as a "forward" shoe and thus produce its maximum braking torque. The movement of piston 17 will cause levers 24 to be rotated about their pivot 25 and by this movement levers 33 will also be rotated about their anchor pin 34 through the medium of links 30. Rotation of levers 33 will cause these levers to fulcrum on the eccentric collar 12 by the engagement of the edges 38 therewith and, consequently, the shoe will be moved into engagement with the drum and anchor on pin 10. Additional pressure upon piston 17 will result in additional pressure on the lower end of the shoe through the lever and linkage mechanism. It is thus seen that by means of the lever and linkage mechanism, pressure is applied to the end of shoe 4 remote from the end upon which it is anchored, thus resulting in shoe 4 acting as a "forward" shoe in the same manner as shoe 3.

When the drum is rotating in reverse direction and the fluid motor is actuated, shoe 3, when forced into engagement with the drum, will be a "reverse" shoe since the drum under these conditions is rotating away from the anchored end thereof. When the lower end of shoe 4 is moved into engagement with the drum by means of the lever and linkage mechanism, the shoe, as soon as it engages the drum, will be moved with the drum and, consequently, anchor upon pin 11 through the medium of levers 33. The force caused by the self-energization of the shoe due to its contact with the drum tends to hold the shoe anchored upon anchor pin 11 and since this force is greater than that being transmitted to levers 33 by the lever and linkage mechanism, these levers will not be moved and, consequently, the force that is being applied to levers 24 by piston 17 will be directly applied to the upper end of the shoe through pivot pin 25 of levers 24. Thus with the force of the piston being applied directly to the end of the shoe adjacent the fluid motor and the other end of the shoe being anchored, shoe 4 will act as a "forward" shoe and the brake, when considered as a whole, will have one "forward" shoe and one "reverse" shoe. The braking torque produced by the brakes under these conditions is ordinarily sufficient for the reverse rotation of the drum since the vehicle is very seldom moving at high rates of speed in the reverse direction and, therefore, it is not necessary that each brake shoe produce its maximum torque.

Figure 7:
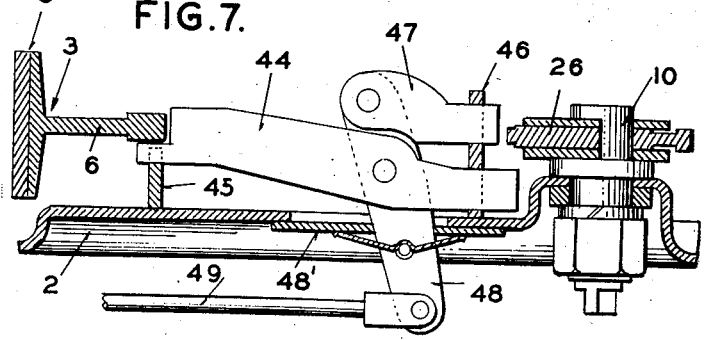
Figure 8:
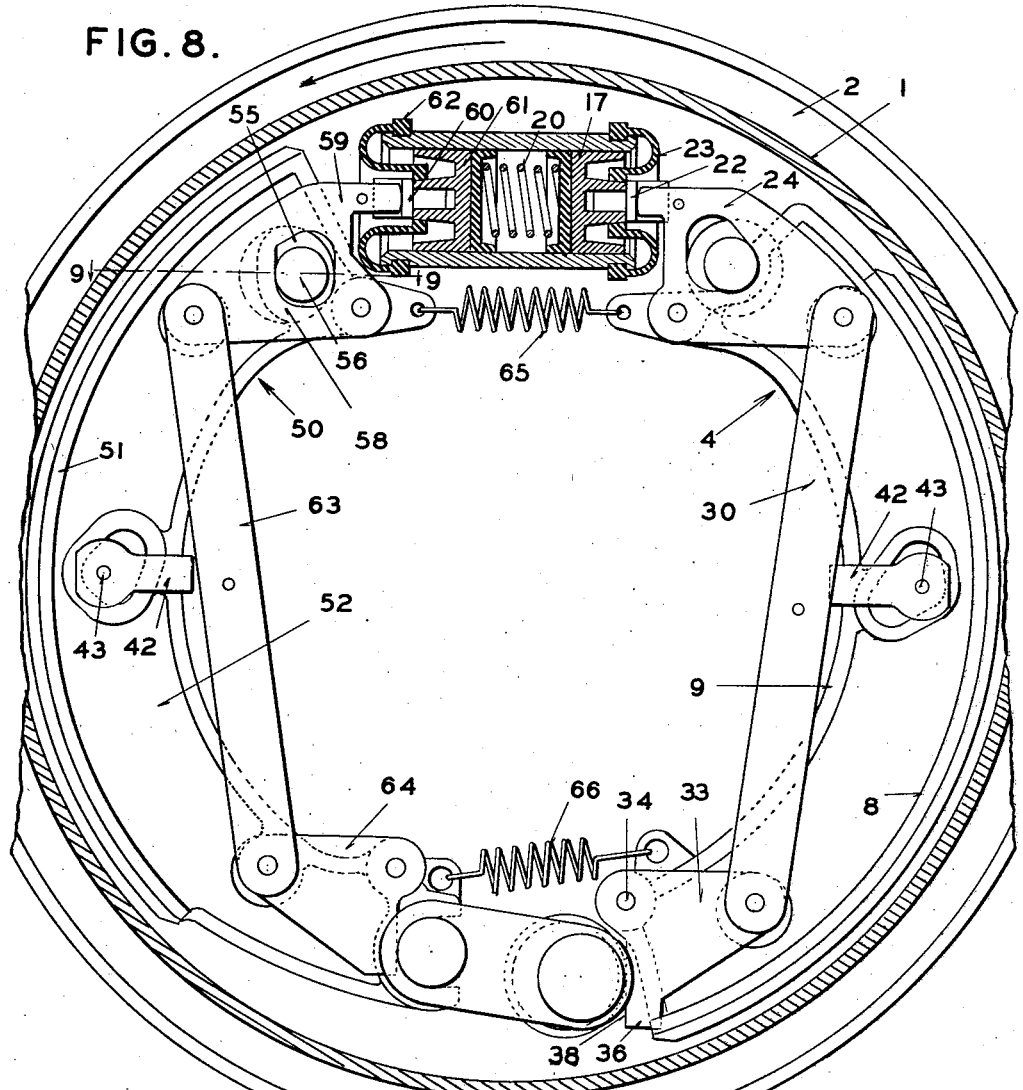

If it is desired to operate the brake shoes by means of the mechanical construction shown in Figure 7, lever 48 is moved to the left by pull rod 49 causing member 44 to engage and actuate shoe 3 and member 47 to engage and actuate shoe 4. Shoe 4 under these circumstances will be held against anchor pin 11 through the medium of levers 33 if the drum is rotating in the direction indicated by the arrow and, therefore, shoe 3 will act as a "forward" shoe and shoe 4 will act as a "reverse" shoe in the same manner as if the lever and linkage mechanism were not employed and shoe 4 were directly pivoted to anchor pin 11. If the drum is rotating in the opposite direction to that indicated by the arrow, shoe 3 will act as a "reverse" shoe and shoe 4 will act as a "forward" shoe. Thus it is seen that when the shoes are mechanically-actuated, the brake is an ordinary two-shoe brake in which there is always one forward shoe and one reverse shoe regardless of the direction of rotation of the drum.

Under some conditions it may be desirable to have a brake in which both shoes are capable of acting as "forward" shoes in both directions of rotation of the drum. In Figures 8, 9, and 10, I have disclosed such a brake wherein shoe 3 has been replaced by a shoe 50 having a lining carrying portion 51 and a web 52. The lower end of this brake shoe is notched, as shown, and engages the eccentric portion of an adjustable anchor pin 53 which is secured to the backing plate by a nut 54. The upper end of this shoe has its web portion provided with an opening 55 through which extends the eccentric portion of an adjustable anchor pin 56, this anchor pin also being secured to the backing plate by a nut 57 (Figure 9). The upper end of the shoe also has pivoted on opposite sides of its web a pair of levers 58 similar to levers 44 previously described with respect to Figure 1. The parts of these levers adjacent fluid motor 14 are formed with extended portions 59 for engagement with plug 60 carried in the end of piston 61 which takes the place of piston 16 of the previously described construction. The open end of the wheel cylinder is closed by a suitable boot 62.

The left ends of levers 58 are pivotally connected to a pair of links 63 which are in turn pivotally connected to a pair of levers 64 pivotally mounted on the lower end of brake shoe 50. The levers 64 are of triangular formation and the lower portions thereof are adapted to directly engage the eccentric portion of anchor pin 53. The pivot pins of links 63 which connect the ends of these links to the levers extend through suitable openings in the web of the shoe in a manner already described. The brake shoe 4, the anchor pins for each end thereof and the lever and linkage mechanism carried by this brake shoe are identical with the structure described in Figure 1 and it is not believed to be necessary to describe this again, reference being had to the previous description. The brake shoes 50 and 54 are held in their retracted positions at their upper ends and against anchor pins 56 and 10 by means of the retractile spring 65, and a similar retractile spring 66 maintains the lower ends of the shoes against the eccentric portions of anchor pins 53 and 11. The spring clips 42 yieldably position both shoes with respect to the backing plate.

In the operation of this brake, when the drum is rotating in the forward direction, as indicated by the arrow, and the fluid motor is actuated, the lower end of shoe 4 will be moved into engagement with the drum by means of the lever and linkage mechanism mounted thereon in a manner already described. The shoe 50 will be brought into engagement with the drum through the lever and linkage mechanism carried thereon and as soon as it engages the drum, it will anchor upon anchor pin 53 and the force applied by the piston 61 will be transmitted directly to the upper end of the shoe since the force of self-energization of the shoe is greater than any force being transmitted through the lever and linkage mechanism tending to move the shoe away from anchor 53.

When the drum is rotating in the direction opposite to that indicated by the arrows and the fluid motor is actuated, shoe 4 will anchor against anchor pin 11 through levers 33 and pressure will be applied to the upper end of the shoe. When shoe 50 is brought into engagement with the drum, it will be carried with the drum and the upper end of the shoe will engage anchor pin 56. The force of piston 61 will be transmitted through levers 58, links 63, and levers 64 and as a result of levers 64 fulcruming on pivot pin 53, the lower end of the shoe will be forced into engagement with the drum.

It is thus seen that when the brake of Figure 8 is operated by the fluid pressure actuating means, each shoe will always be actuated at the end remote from the end upon which it anchors, thus producing a brake in which both shoes will act as "forward" shoes regardless of the direction of rotation of the drum.

Having fully described my invention, what I claim as new and desire to secure by Letters Patent of the United States is:

1. In braking mechanism, the combination of a support, a rotatable drum, a brake shoe adapted to cooperate with the drum, means on the support constituting an anchor for one end of the shoe when the drum is rotating in one direction, actuating means positioned adjacent said end of the shoe which anchors on the support, and mechanical force transmitting means carried in its entirety by the shoe and cooperating with the actuating means and with the remote end of the shoe whereby said remote end may be actuated into engagement with the drum.

2. In braking mechanism, the combination of a support, a rotatable drum, a brake shoe adapted to cooperate with the drum, means on the support constituting an anchor for one end of the shoe when the drum is rotating in one direction, a fluid motor positioned adjacent said end of the shoe which anchors on the support, and mechanical force transmitting means carried in its entirety by the shoe and cooperating with the fluid motor and with the remote end of the shoe whereby said remote end may be actuated into engagement with the drum.

3. In braking mechanism, the combination of a support, a rotatable drum, a brake shoe adapted to cooperate with the drum, means on the support constituting an anchor for one end of the shoe when the drum is rotating in one direction, actuating means positioned adjacent said end of the shoe which anchors on the support, and mechanical means for actuating the remote end of the shoe by said actuating means and comprising a lever and linkage mechanism mounted solely on the shoe.

4. In braking mechanism, the combination of a support, a rotatable drum, a brake shoe extending over substantially 180 degrees of the drum and adapted to cooperate with the drum, means carried by the support for anchoring one end of the shoe when the drum is rotating in one direction and other means carried by the support for anchoring the other end of the shoe when the drum is rotating in the other direction, a single actuator positioned adjacent one end of the shoe, means whereby the single actuator actuates said adjacent end of the shoe by a direct force from the actuator when the drum is rotating in one direction, and other means whereby the single actuator actuates the other end of the shoe when the drum is rotating in the reverse direction.

5. In braking mechanism, the combination of a support, a rotatable drum, a brake shoe extending over substantially 180 degrees of the drum and adapted to cooperate with the drum, means carried by the support for anchoring one end of the shoe when the drum is rotating in one direction and other means carried by the support for anchoring the other end of the shoe when the drum is rotating in the other direction, a fluid motor adjacent one end of the shoe, and means whereby a movable element of the fluid motor directly actuates said adjacent end of the shoe by a movement in the same direction as the movement of the end of the shoe when the drum is rotating in one direction and actuates the other end of the shoe when the drum is rotating in the reverse direction.

6. In braking mechanism, the combination of a support, a rotatable drum, a brake shoe extending over substantially 180 degrees of the drum and adapted to cooperate with the drum, means carried by the support for anchoring one end of the shoe when the drum is rotating in one direction and other means carried by the support for anchoring the other end of the shoe when the drum is rotating in the other direction, an actuator positioned adjacent one end of the shoe, means whereby the actuator actuates said adjacent shoe end when the direction of rotation of the drum is such that the shoe anchors at the other end, and means carried in its entirety by the shoe whereby the actuator actuates the other end of the shoe when the drum is rotating in the opposite direction.

7. In braking mechanism, the combination of a support, a rotatable drum, a brake shoe extending over substantially 180 degrees of the drum and adapted to cooperate with the drum, means carried by the support for anchoring one end of the shoe when the drum is rotating in one direction and other means carried by the support for anchoring the other end of the shoe when the drum is rotating in the other direction, a fluid motor positioned adjacent one end of the shoe and adapted to actuate said shoe end into engagement with the drum when the direction of rotation of the drum is such that the shoe anchors at the opposite end, and mechanical means whereby said fluid motor will actuate the other end of the shoe when the drum is rotating in the other direction, said mechanical means comprising a lever and linkage mechanism mounted solely on the shoe.

8. In braking mechanism, the combination of a support, a rotatable drum, a brake shoe extending over substantially 180 degrees of the drum and adapted to cooperate with the drum, means carried by the support for anchoring one end of the shoe when the drum is rotating in one direction and other means carried by the support for anchoring the other end of the shoe when the drum is rotating in the other direction, a fluid motor positioned adjacent one end of the shoe and adapted to actuate said shoe end into engagement with the drum when the direction of rotation of the drum is such that the shoe anchors at the opposite end, and means whereby said fluid motor actuates the other end of the shoe when the drum is rotating in the other direction, said means comprising a lever pivoted on the end of the shoe adjacent the fluid motor, a lever pivoted on said other end of the shoe and having a portion fulcruming on the anchor means therefor, and a link interconnecting the levers.

9. In braking mechanism, the combination of a support, a rotatable drum, two brake shoes positioned in end-to-end relation and adapted to cooperate with the drum, means carried by the support and constituting an anchor for one end of one shoe, other means carried by the support and constituting an anchor for the diametrically opposite end of the other shoe, an actuating member positioned adjacent one pair of ends of the shoes, means for applying pressure by said actuating member to the adjacent free end of one of the shoes, and means carried in its entirety by the other shoe for applying pressure by said actuating member to the remote end of said other shoe.

10. In braking mechanism, the combination of a support, a rotatable drum, two brake shoes positioned in end-to-end relation and adapted to cooperate with the drum, means carried by the support and constituting an anchor for one end of one shoe, other means carried by the support and constituting an anchor for the diametrically opposite end of the other shoe, a fluid motor positioned between one pair of ends of the shoes, means for applying pressure by said fluid motor to the adjacent free end of one of the shoes, and means for applying pressure by said fluid motor to the remote end of said other shoe, said last named means comprising a lever and linkage mechanism mounted on said other shoe.

11. In braking mechanism, the combination of a support, a rotatable drum, two brake shoes positioned in end-to-end relation and adapted to cooperate with the drum, means carried by the support and constituting an anchor for one end of one shoe, means carried by the support for anchoring one end of the other shoe when the drum is rotating in one direction, other means carried by the support for anchoring the other end of said other shoe when the drum is rotating in the other direction, actuating means positioned between the free end of the first named shoe and the adjacent end of the other shoe and adapted to directly actuate said free end only in both directions of rotation of the drum, and means whereby said actuating means actuates the remote end of the other shoe when the drum is rotating in one direction and actuates the adjacent end of said other shoe when the drum is rotating in the opposite direction.

12. In braking mechanism, the combination of a support, a rotatable drum, two brake shoes positioned in end-to-end relation and adapted to cooperate with the drum, means carried by the support and constituting an anchor for one end of one shoe, means carried by the support for anchoring one end of the other shoe when the drum is rotating in one direction, other means carried by the support for anchoring the other end of said other shoe when the drum is rotating in the other direction, a fluid motor positioned between the free end of the first named shoe and the adjacent end of the other shoe and adapted to directly actuate said free end of the first named shoe, and means whereby said fluid motor actuates the remote end of the other shoe when the drum is rotating in one direction and the adjacent end of said other shoe when the drum is rotating in the opposite direction, said last named means including a force transmitting means carried by said other shoe.

13. In braking mechanism, the combination of a support, a rotatable drum, two brake shoes positioned in end-to-end relation in the drum, anchor means carried by the support and constituting an anchor for each end of each shoe whereby each shoe may anchor on one end when the drum is rotating in one direction and anchor on the other end when the drum is rotating in the opposite direction, actuating means positioned between one pair of adjacent ends of the shoes, and means whereby said actuating means directly actuates the adjacent end of one shoe and the remote end of the other shoe when the drum is rotating in one direction and directly actuates the adjacent end of said other shoe and the remote end of the first named shoe when the drum is rotating in the opposite direction.

14. In braking mechanism, the combination of a support, a rotatable drum, two brake shoes positioned in end-to-end relation in the drum, anchor means carried by the support and constituting an anchor for each end of each shoe whereby each shoe may anchor on one end when the drum is rotating in one direction and anchor on the other end when the drum is rotating in the opposite direction, a fluid motor positioned between one pair of adjacent ends, means whereby said fluid motor actuates the adjacent end of one of the shoes when the drum is rotating in one direction, a lever and linkage mechanism mounted on the other shoe whereby said fluid motor actuates the remote end of said other shoe when the drum is rotating in said direction, means whereby said fluid motor actuates the adjacent end of the other shoe when the drum is rotating in the other direction, and a lever and linkage mechanism mounted on the first mentioned shoe whereby said fluid motor actuates the remote end thereof when the drum is rotating in the last mentioned direction.

15. In braking apparatus, the combination of a support, a rotatable drum, two brake shoes positioned in end-to-end relation and adapted to cooperate with the drum, an anchor pin for each end of each shoe, said anchor pins being carried by the support and permitting each shoe to anchor at one end when the drum is rotating in one direction and to anchor at the other end when the drum is rotating in the other direction, a fluid motor positioned between one pair of adjacent ends of the shoes, levers pivotally mounted on each end of each shoe, and links interconnecting the levers, the levers on the ends of the shoes adjacent the fluid motor being adapted to be actuated by said motor and the levers on the opposite ends of the shoes being adapted to fulcrum on the respective anchor pins for said shoe ends.

16. In braking mechanism, the combination of a support, a rotatable drum, a brake shoe extending over substantially 180 degrees of the drum and adapted to cooperate with the drum, means carried by the support for anchoring one end of the shoe when the drum is rotating in one direction and other means carried by the support for anchoring the other end of the shoe when the drum is rotating in the other direction, a fluid motor comprising a movable element for directly actuating one end of the brake shoe into engagement with the drum by a movement in the same direction as the movement of the end of the shoe when the drum is rotating in one direction, and mechanical force transmitting means actuated by the movable element for actuating the other end of the shoe into engagement with the drum when the drum is rotating in the reverse direction.

17. In braking mechanism, the combination of a support, a rotatable drum, a brake shoe extending over substantially 180 degrees of the drum and adapted to cooperate with the drum, means carried by the support for anchoring one end of the shoe when the drum is rotating in one direction and other means carried by the support for anchoring the other end of the shoe when the drum is rotating in the other direction, a fluid motor comprising a movable element for directly actuating one end of the brake shoe into engagement with the drum by a movement in the same direction as the movement of the end of the shoe when the drum is rotating in one direction, and mechanical means actuated by the movable element for actuating the other end of the shoe into engagement with the drum when the drum is rotating in the reverse direction, said mechanical means comprising a lever and link mechanism carried by the shoe.

STEVE SCHNELL.